United States Patent

[11] 3,583,323

| [72] | Inventors | Francois Gilbert Paris<br>Bayonne;<br>Francois Louis Giraud, Plaisir, both of,<br>France |
|---|---|---|
| [21] | Appl. No. | 798,989 |
| [22] | Filed | Feb. 13, 1969 |
| [45] | Patented | June 8, 1971 |
| [73] | Assignee | Societe De L'Aerotrain<br>Paris, France |
| [32] | Priority | Feb. 14, 1968, Oct. 23, 1968 |
| [33] | | France |
| [31] | | 139877 and 171002 |

[54] GAS-CUSHION VEHICLE
8 Claims, 11 Drawing Figs.

[52] U.S. Cl. .................................................. 104/23FS,
104/23, 104/134
[51] Int. Cl. ......................................................... B61b 13/08
[50] Field of Search ............................................. 104/23 FS,
23; 180/7 FS

[56] References Cited
UNITED STATES PATENTS

| 3,417,709 | 12/1968 | Bertin et al. ................. | 104/23FS |
|---|---|---|---|
| 3,420,329 | 1/1969 | Moore ......................... | 180/118 |
| 3,486,577 | 12/1969 | Jackes ......................... | 180/126 |

*Primary Examiner*—Arthur L. LaPoint
*Assistant Examiner*—D. W. Keen
*Attorney*—Stevens, Davis, Miller & Mosher ABSTRACT: A gas-cushion vehicle incorporating a device for controlling the balance and stability of the vehicle. The vehicle has a chamber confining at least one cushion of gas, and the device comprises means to produce, under the action of the flow of gas from the cushion, aerodynamic forces which will produce a moment in respect of pitch or roll. The chamber is bounded by adjustable surfaces representing a convergent-divergnet configuration providing a nozzle the cross-sectional area of which is adjustable at will.

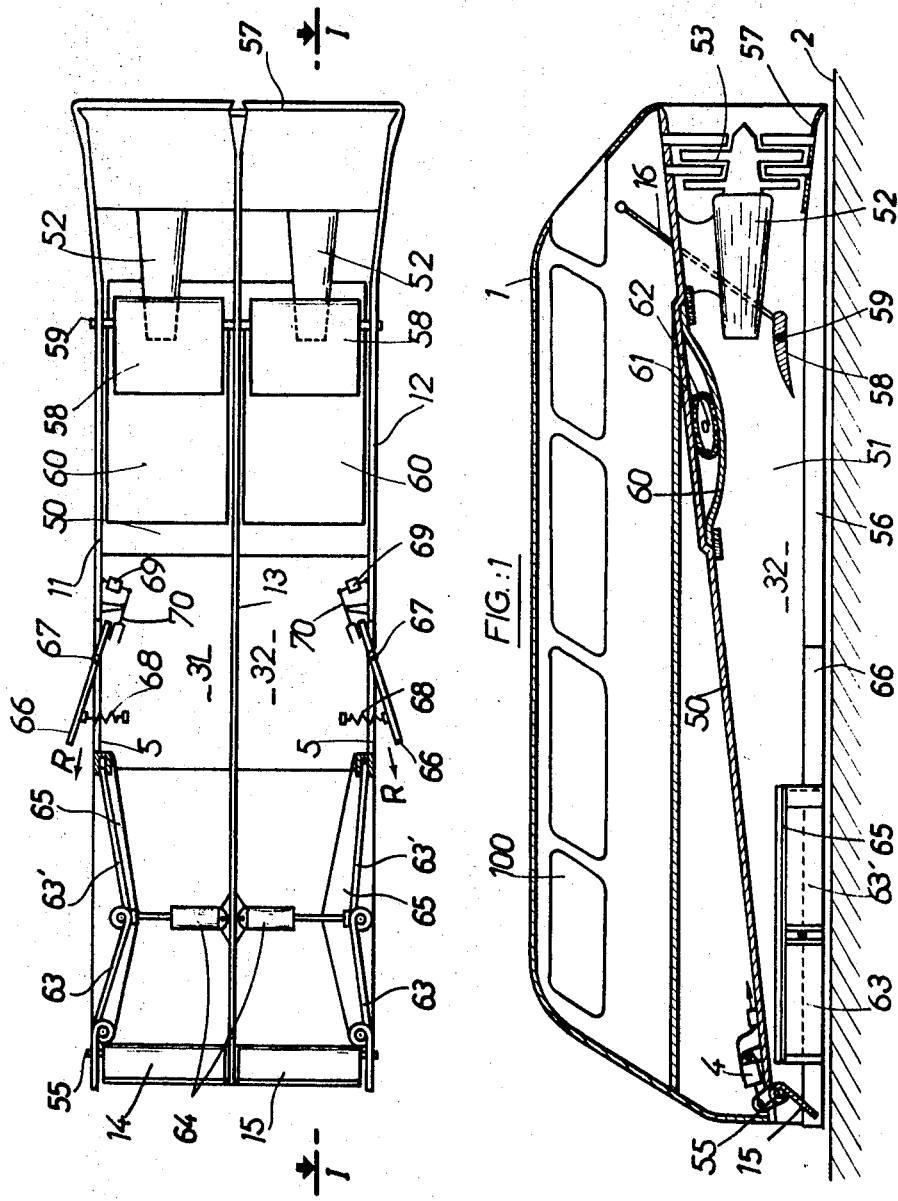
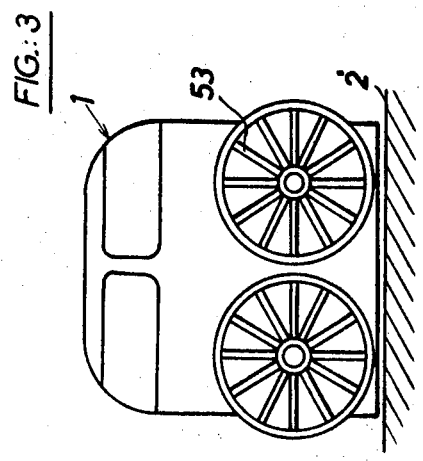

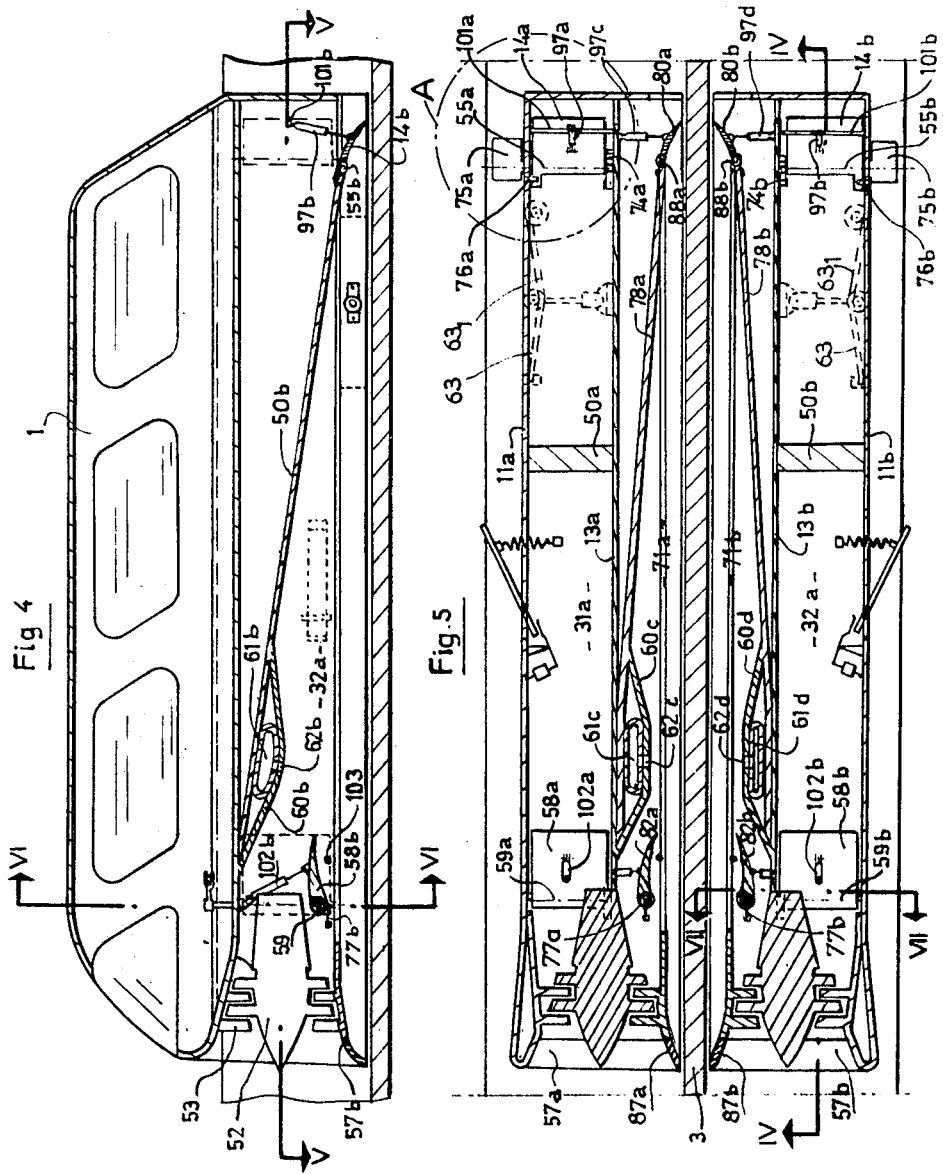

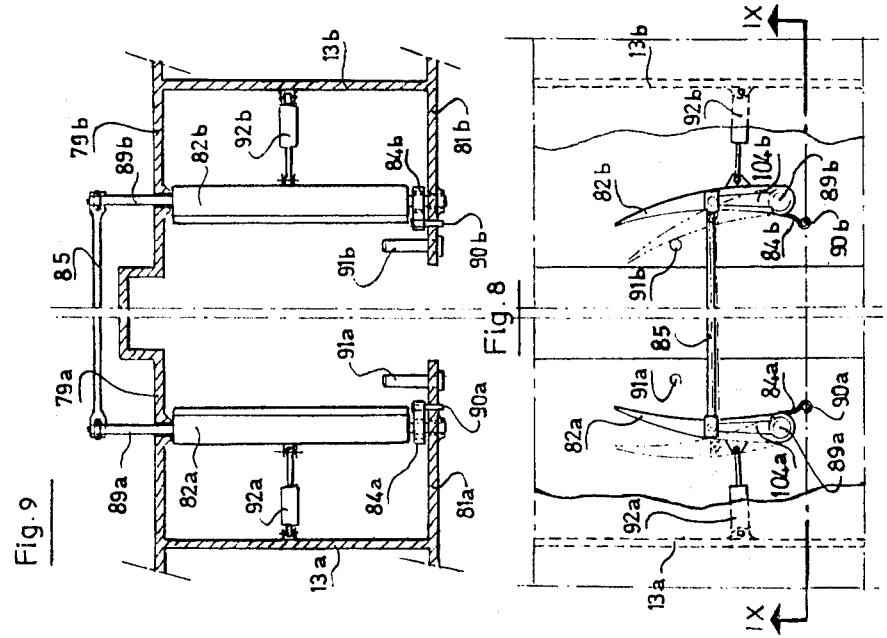
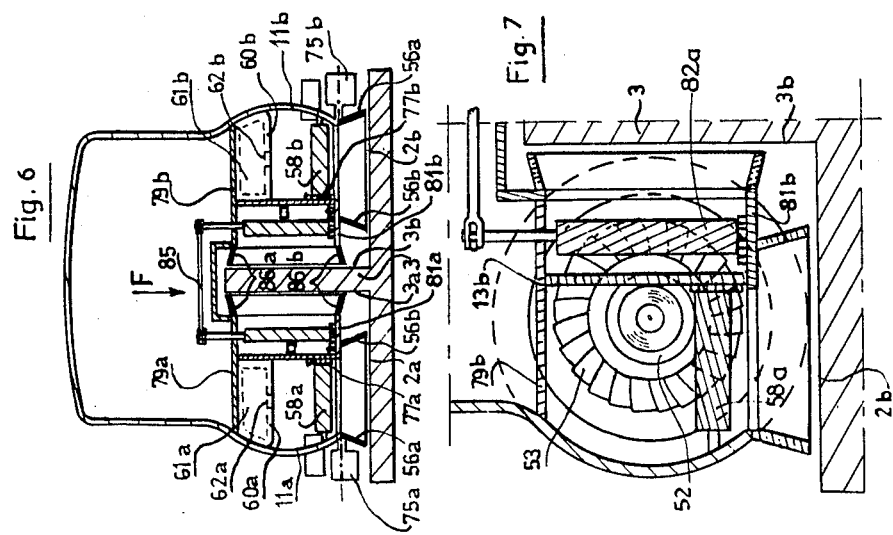

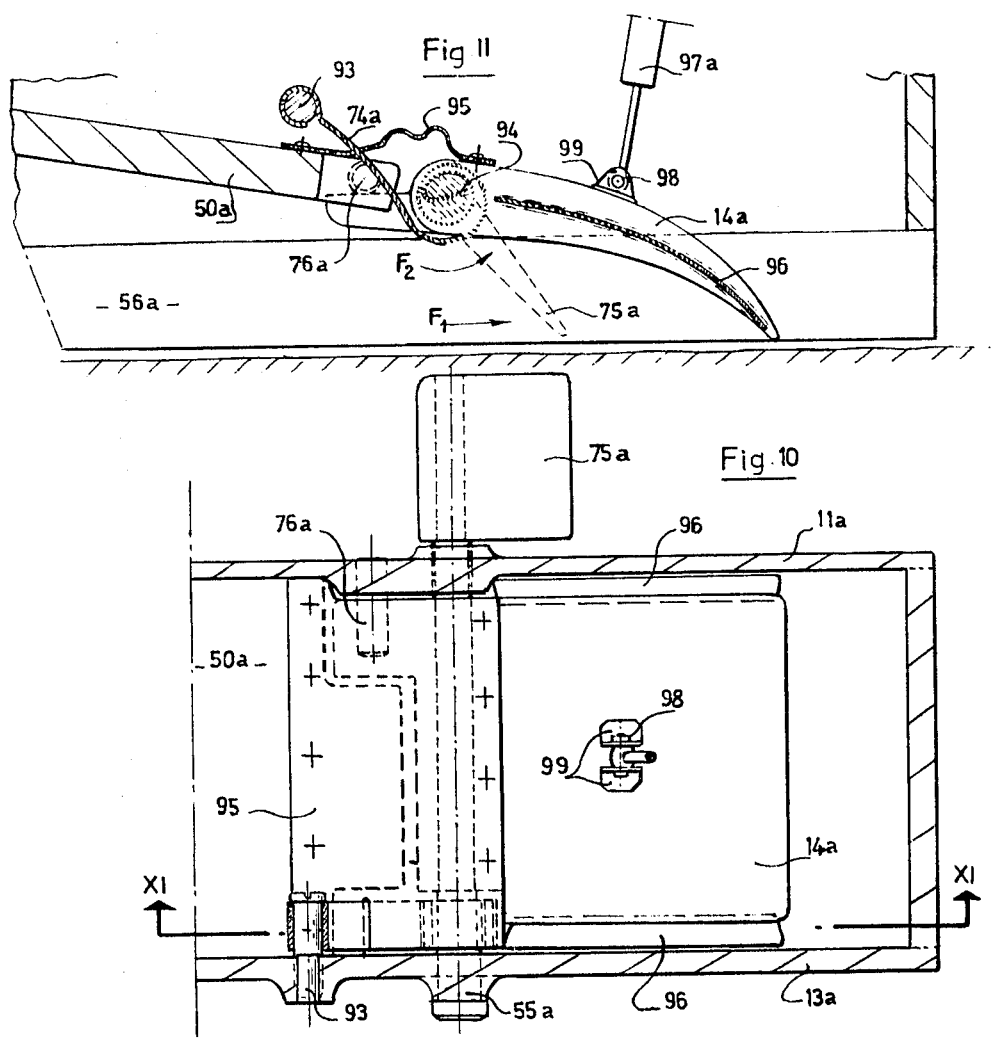

GAS-CUSHION VEHICLE

This invention relates to gas-cushion vehicles and has for its object to provide a device for monitoring the trim of a gas-cushion vehicle and for controlling the stability of such a vehicle in respect of pitching and/or roll.

The invention is applied more particularly to vehicles supported by one or more longitudinal cushions each confined by means of an enclosure of the plenum chamber type and supplied with compressed gas from the front of the vehicle which escapes to the surrounding environment via the rear of the vehicle, so furnishing a propulsive thrust. In vehicles of this type a rapid flow of gas occurs at the cushion or cushions, this differing from the usual gas cushions in which the speed component is negligible and which themselves merely support the vehicle under static pressure. In cushions with a rapid rate of flow, to which the present invention more particularly applies, the same static pressure exists with the same supporting effect, but to this there is added a considerable velocity directed towards the rear of the vehicle, this velocity corresponding to a dynamic pressure and providing the propulsive force.

In accordance with the present invention, the stability of a gas-cushion vehicle in respect of pitching is ensured by suitably contoured adjustable surfaces, so as to produce aerodynamic stabilizing forces as a result of the gas flowing over them. These surfaces will preferably be distributed on either side of the transverse axis passing through the center of gravity of the vehicle and at as great a distance as possible from this center towards the front and rear respectively.

To this end, and according to one embodiment of the invention, at least one adjustable wall unit is provided which forms part of a system of walls defining the plenum chamber, the unit being capable of displacement or deformation transversely to the general direction of the gas flow in the cushion, so that the chamber will assume, in the general direction of the flow, a convergent-divergent configuration providing a nozzle which is adjustable at will.

It is well known that such a nozzle gives rise to a Venturi effect which leads to reduced pressure along the surfaces constituting the nozzle. The movable wall unit may be constituted by selected zones on the surface of the vehicle defining the cushion, or by a deformation or a displacement of the devices providing lateral confinement to the cushion or cushions. A pitching moment may likewise to produced by modifying the distance of the adjustable surfaces from the transverse axis passing through the center of gravity of the vehicle.

In a case in which at least two cushions are arranged longitudinally between the vehicle frame and the surface along which the vehicle moves, it may be of advantage to control the adjustable surfaces independently rather than in unison so as to control the stability of the vehicle in respect of roll. It should likewise be noted that controlling the stability of such vehicles in respect of roll may be brought about by varying the amount of gas introduced into each cushion and/or by varying the pressure prevailing in the cushions, this being effected more particularly by controlling the escape of the gas from the cushions to the environment.

The trim-monitoring devices may be controlled automatically, as may also the escape of fluid at the rear of the vehicle. Preferably the guidance of the vehicle will be effected by cushions of compressed gas which cooperate with surfaces provided with this object, and more particularly with the substantially vertical surfaces of a track having the form of an inverted T. Similarly to the support-providing cushions, these cushions may constitute cushions of fast-flowing compressed gas and likewise contributing to the propulsion of the vehicle, the cushions being optionally provided with devices for monitoring the lateral stability of the vehicle that are identical with the devices employed in the supporting cushions. By way of modification, the guidance cushions may also be so designed that they merely produce simple static pressure.

The supply of compressed gas to the supporting and to the guidance cushions arranged on the same side of the vehicle with reference to its longitudinal median plane is preferably performed by a suitably shared generator, but it is equally possible to utilize an independent supply to the supporting and guidance cushions.

The following description referring to the accompanying drawings and given by way of nonlimitative example will explain how the invention may be put into effect. In the drawings:

FIG. 1 is a diagrammatic view in longitudinal section of an air-cushion vehicle according to the invention, the section being taken along the line I–I in FIG. 3, FIGS. 2 and 3 respectively show the vehicle of FIG. 1 in front elevation and plan, FIG. 4 is a diagrammatic view in longitudinal section, taken along the line IV–IV in FIG. 5, of a air-cushion vehicle in accordance with one variant of the invention and associated with a track in the form of an inverted T, FIGS. 5 and 6 are respectively sectional views of the vehicle along the lines V–V and VI–VI in FIG. 4, FIG. 7 is a fragmentary view in section taken along the line VII–VII of FIG. 5, the view being on a larger scale and illustrating the shared supply to a supporting cushion and to a guidance cushion according to the invention, FIG. 8 is a fragmentary view on a larger scale taken in the direction of the arrow F in FIG. 6, certain parts being omitted for clarity, FIG. 9 is a sectional view along the line XI–IX in FIG. 8, FIG. 10 is a plan view partly in section, but on a larger scale, of the detail A in FIG. 5, and FIG. 11 is a sectional view along the line XI–XI in FIG. 10.

In the embodiment shown in FIGS. 1 to 3, the vehicle 1 moves along a substantially flat surface 2 which may constitute a track providing guidance, for example a porous track such as is described in U.S. Pat. application No. 768,286 filed Oct. 17, 1968. The vehicle 1 is fitted with bodywork comprising a cabin 100 for passengers in the upper portion. Below the cabin 100 an oblique wall 50, two sides 11 and 12, a longitudinal partition 13 and the supporting surface 2 define two enclosures 31 and 32 of the plenum chamber type, having a cross section which decreases from the front to the rear of the vehicle.

At the front of the vehicle, each of the chambers 31 or 32 includes a corresponding propulsive motor 52 which drives a compressor 53 and delivers air to the chambers 31 and 32. At the rear, the boundaries of the chambers 31 and 32 are defined by transverse walls 14 and 15 respectively which are pivoted about horizontal axes 55 and the inclination of which may be adjusted by Jacks 4. These movable walls 14 and 15, by means of their controlled or automatic opening, permit the rearward escape of a portion of the airflow delivered by the compressors 53.

It will be noted that, in the example presently described, the two chambers 31 and 32, separated by the longitudinal partition 13, are in another respect bounded in the vicinity of the supporting surface 2 by walls 56, preferably resilient, which reduce leakage of air to the side of the vehicle. Another wall 57, resilient if so required, performs the same function as regards leakage of air at the front of the vehicle.

In each of the chambers 31 or 32, a movable fin 58 may be pivotally mounted about a horizontal axis 59 by either automatic or manually operated means such as a lever 16, so as to deflect downwardly a portion of the flow from the compressors 53 or to provide supplementary lift (or, on the contrary, negative lift) to the front part of the vehicle.

A resilient wall unit 60, for example made of thin metal and arranged in each of the chambers 31 and 32, may assume several positions. The wall unit 60 may be urged against the upper inclined wall 50 of the chamber 31 or 32 or, as is shown in FIG. 1, deformed as regards its center towards the interior of the chambers so as locally and progressively to reduce the cross-sectional area available for the passage of air, which results in increased local velocity with a decrease in static pressure, and consequently a decrease in lift in this region. In the example shown, the means for effecting the deformation of the resilient wall unit 60 comprise an inflatable body 61 which is disposed within the unit 60 and connected by a pipe 62 to an appropriate pressure source (not shown).

At the rear of the vehicle, the longitudinal sides 11 and 12 are interrupted to accommodate two movable walls 63 and 63', relatively pivotable under the action of a jack 64 which renders it possible, whenever desired, for them to project into the air cushion (as shown in the upper part of FIG. 3) so as to effect, in like manner to the resilient wall 60, a localized decrease in cross-sectional area with the same effect of localized reduced lift through a decrease in the static pressure. The movable walls 63 and 63' cooperate in a substantially airtight manner with the covering plates 65 so as substantially to prevent leakage of air from the cushion at this level when the walls project into the cushions and are no longer aligned with the sides 11 and 12.

The longitudinal sides 11 and 12 may be apertured, as has been described in the above-mentioned Patent Application, to provide apertures 5 (see FIG. 3) provided with flaps 66 pivoting about axes 67. These flaps are adjusted by springs 68, and through the agency of levers such as those at 70 are operated by jacks 69. When operative, the flaps 66 are initially closed and block the apertures 5. When the desired pressure has been reached in the cushion, the flaps 66 pivot about the axes 67 under the action of the jacks 69, for example in such a way as to assume the position shown in FIG. 3. The air is thus able to make its escape in the direction of the arrows R.

In the embodiment shown in FIGS. 4, 5 and 6, the air-cushion vehicle 1 runs along a track in the form of an inverted T and which includes two surfaces 2a and 2b which are substantially horizontal and which form the supporting portions of the track, and a guidance projection or extension 3 whose surfaces 3a and 3b are substantially vertical. Chambers 31a and 32a which confine the supporting cushions of the vehicle are defined by the sides 11a and 11b, by the longitudinal walls 13a and 13b, by the inclined walls 50a and 50b, and by the surfaces 2a and 2b of the track.

The sides 11a and 11b, as well as the longitudinal walls 13a and 13b, are in addition extended in the vicinity of the supporting surfaces 2a and 2b by walls 56a and 56b, which are preferably resilient and which reduce air leakage to the side. Two further walls 57a and 57b, resilient if so required, perform the same function as regards air leakage at the front of the vehicle.

At the front of each chamber 31a or 32a, a corresponding propulsion motor 52 drives a compressor 53 and delivers compressed air to the chambers 31a and 32a in order to form fast-flowing cushions of compressed air. At the rear of the vehicle, flaps 14a and 14b, are mounted on substantially horizontal pivot rods 55a and 55b respectively, and kept under suitable adjustment, for example by means of helical springs 74a and 74b associated with damping devices such as the dampers 97a and 97b, render it possible to adjust the throughput of compressed air employed for the propulsion of the vehicle.

When the speed of the vehicle increases, the flaps have to open further because, when the vehicle is moving at high speed, compressor 53 sucks air which is rammed with substantial kinetic energy; so it need not impart too high a rise in static pressure to the air in order to produce the required lift. Therefore a greater proportion of the dynamic pressure may be employed to effect propulsion of the vehicle.

With this aim in view, arrangements are made for aerodynamic flaps 75a and 75b outside the vehicle proper and connected to the flaps 14a and 14b, the flaps 75a and 75b opening under the influence of the dynamic pressure of the outside air as the vehicle reaches a certain speed. Stops 76a and 76b enable the flaps 14a and 14b to provide a small leakage of air at startup and when the vehicle is travelling relatively slowly.

The mounting of a flap 14a, together with its associated flap 75a, is shown in detail in FIGS. 10 and 11. The pivot rod 55a rotates freely in the side 11a and the longitudinal wall 13a of the vehicle, and is rigidly connected to the flaps 14a and 75a.

The helical spring 74a is connected, on the one hand, to a stud 93 secured in the wall 13a of the vehicle and, on the other hand, to the rod 55a, one end of the spring 74a being secured in a slot 94 in the rod 55a. A damper 97a is connected to the flap 14a by a bearing 98 mounted in bearing brackets 99. A resilient seal 95 limits the leakage of compressed air between the wall 50a and the flap 14a. Resilient seals 96 attached on either side of the flap 14a limit leakage of air to the side.

Thus, when the flap 75a is subject to a force directed according to the arrow $F_1$ in FIG. 11, due to the dynamic air pressure as a result of forward movement of the vehicle, the flap 75a causes the rod 55a and the flap 14a to rotate in the direction of the arrow $F_2$ in FIG. 11. When the dynamic pressure of the air decreases, the spring 74a restores the flaps 14a and 75a to their initial resting position, damping of the device being effected by the damper 97a attached by its upper portion to a crossbar 101a secured to the vehicle frame (FIG. 5). The mounting of the flaps 14b and 75b is similar to that described for the flaps 14a and 75a.

Fins 58a and 58b, arranged in each of the chambers 31a and 32a, are movable about the substantially horizontal axes 59a and 59b respectively, and are biased, for example, by helical springs 77a and 77b, so that, when a drop in dynamic pressure occurs in relation to the reference pressure in the forward part of the vehicle, the fins 58a and 58b assume an inclined attitude under the action of the springs, so that they direct a jet of compressed air towards the track. Under normal operating conditions, the dynamic pressure of the air acting on the fins 58a and 58b maintains them in a substantially horizontal position, in spite of the effect of the springs 77a and 77b. Appropriate devices, such as dampers 102a and 102b, are attached respectively to the fins 58a and 58b in order to prevent vibration of the latter. Stops 103 limit the respective travel of the fins 58a and 58b when the vehicle is at rest.

By way of modification or as an additional feature, resilient wall units 60a and 60b, arranged in the forward part of the vehicle surround inflatable bodies 61a and 61b having apertures 62a and 62b which allow them to communicate with the chambers 31a and 32a respectively and which are so positioned that they tap the static pressure in the chambers. If therefore an excessive flow occurs in the forward part of the vehicle, a pressure drop takes place at the throat formed by said resilient walls and is communicated to the inflatable bodies via the apertures 62a and 62b, *located at this spot, and the inflatable bodies 61a and 61b* flatten out increasing the cross-sectional area available for the passage of air, this having the effect of decreasing the velocity of airflow in this part while increasing the static pressure and, consequently, the lift in the forward part of the vehicle. The reverse effect would occur if there were an increase of pressure in the forward part of the vehicle. These phenomena occur because, in such Venturi-shaped passages, variations in static pressure are practically limited in the immediate vicinity of the throat.

Chambers 71a and 71b confining the guidance cushions for the vehicle are defined respectively by the substantially horizontal walls 79a and 79b, the similarly substantially horizontal walls 81a and 81b, and the inclined walls 78a and 78b. In the vicinity of the surfaces 3a and 3b the walls 79a and 79b, 81a and 81b terminate in walls 86a and 86b, preferably resilient, which reduce air leakage to the side. Two other walls 87a and 87b, resilient if so required, perform the same function as regards leakage from the chambers towards the front of the vehicle.

The supply of compressed air to the chambers 71a and 71b is effected by the same means as for the supporting cushions, and the chambers also form cushions of fast-flowing compressed air (FIG. 7). At the rear of the chambers, the flaps 80a and 80b, pivoting about the substantially vertical axes 88a and 88b respectively, perform the same function as the flaps 14a and 14b associated with the supporting cushions, and are adjusted by a controlling mechanism, (not shown) originating in the flaps 14a and 14b. The flaps 80a and 80b are likewise associated with suitable means, such as dampers 97c and 97d respectively, to prevent vibration.

In each of the chambers 71a and 71b arrangements may likewise be made for fins 82a and 82b, the mounting of which is shown in greater detail in FIGS. 8 and 9, the projection 3 and the resilient walls 86a and 86b being omitted. The fins are pivoted about substantially vertical axes 89a and 89b respectively, and are kept in adjustment by helical springs 84a and 84b attached to studs 90a and 90b secured in the walls 81a and 81b, so that the fins will perform the same function as the fins 77a and 77b associated with the supporting cushions. The fins 82a and 82b are interconnected by a coupling bar 85 and small rods 104a and 104b which are pivotable about axes 89a and 89b respectively. Appropriate means, such as dampers 92a and 92b attached to the walls 13a and 13b and to the fins 82a and 82b respectively, prevent the fins from commencing to vibrate under the action of the helical springs. Two stops 91a and 91b respectively limit the movement of the fins 82a and 82b.

The operation of the system is as follows: when, for example, a drop of pressure in relation to the reference pressure occurs in the forward part of the chamber 71a, the fin 82a has a tendency to turn back towards the surface 3a of the projection 3 (FIG. 5), thereby causing an increase in pressure in the forward part. The fin 82b moves away from the surface 3b by virtue of the small rods 104a and 104b, the coupling bar 85 and so bringing about a drop in pressure in the forward part of the chamber 71b, this having the effect of accelerating the stabilization of pressure in the chambers 71a and 71b.

By way of modification or addition, resilient walls 60c and 60d, enclosing inflatable bodies 61c and 61d and provided with apertures 62c and 62d which render it possible for them to communicate with the chambers 71a and 71b, perform the same functions as the inflatable bodies 61a and 61b used in the supporting cushions. The supply of compressed air to the guidance and supporting cushions could equally be effected by independent compressors, one supplying a guidance cushion, the other supplying a supporting cushion.

We claim:

1. In combination with a gas-cushion vehicle adapted to move along a supporting surface and comprising a system of walls defining an enclosure of the plenum chamber type which in cooperation with said supporting surface confines at least one cushion of gas, a controlling device comprising an adjustable flap arranged at the rear of the vehicle and forming part of the system of walls, the said flap regulating the throughput of compressed gas escaping from the cushion, and an adjustable aerodynamic flap outside the vehicle proper, connected to the first flap and sensitive to the dynamic pressure due to the displacement of the vehicle.

2. A surface effect machine movable along a bearing surface with the interposition of a dynamic fluid cushion formed by a fluid stream forcefully circulated from fore to aft through a channel extending longitudinally of said machine adjacent said surface, wherein the improvement comprises at least one intermediate section incorporated in said channel and having a convergent-divergent configuration including a variable-area throat, and an inflatable body fitted on said machine and adapted for adjusting the area of said throat.

3. A machine according to claim 2, further comprising static pressure-tapping means positioned in the region of said throat and connected to said inflatable body to control the same in response to variations in static pressure at said throat.

4. A surface effect machine movable along a bearing surface with the interposition of a dynamic fluid cushion formed by a fluid stream forcefully circulated from fore to aft through a channel extending longitudinally of said machine adjacent said surface, wherein the improvement comprises at least one intermediate section incorporated in said channel and having a convergent-divergent configuration including a variable-area throat, and means on said machine for adjusting the area of said throat.

5. A machine according to claim 4, wherein said intermediate section of said channel comprises deformable wall means defining at least partly said intermediate section, and said throat area adjusting means comprises means for positively deforming said wall means.

6. A machine according to claim 5, wherein said deformable wall means comprise at least two rigid wall portions hingedly connected together in the region of said throat.

7. A ground effect machine movable along a track having a first operative surface for supporting the machine and a second operative surface for guiding the same, said machine, comprising first and second longitudinally extending cushion-confining channels respectively facing said supporting track surface and said guiding track surface, means for constraining a stream of fluid to flow longitudinally through at least one of said channel whereby to provide therein a dynamic fluid cushion between the machine and the respective operative track surface, said channel comprising at least one intermediate section having a convergent-divergent configuration including a variable-area throat, and means on said machine for adjusting the area of said throat.

8. A surface effect machine movable along a bearing surface, comprising at least one longitudinally extending cushion-confining channel, means for constraining a stream of fluid to flow longitudinally through said channel whereby to provide in said channel a dynamic fluid cushion between the machine and the bearing surface, a rear flap adjustably positioned across said channel adjacent the rear end thereof to adjustably close said rear end, and means sensing the speed of the machine for adjusting the position of said rear flap in response to said speed, wherein said speed sensing means comprise an aerodynamic flap integral with said rear flap and extending outside the cushion-confining channel into the slipstream of the machine.